Sept. 6, 1949. H. E. PRESNELL 2,480,959
CARGO LOADER FOR VEHICLES
Filed July 3, 1947 3 Sheets-Sheet 1

Inventor
HARRY E. PRESNELL

By Randolph & Beavers
Attorneys

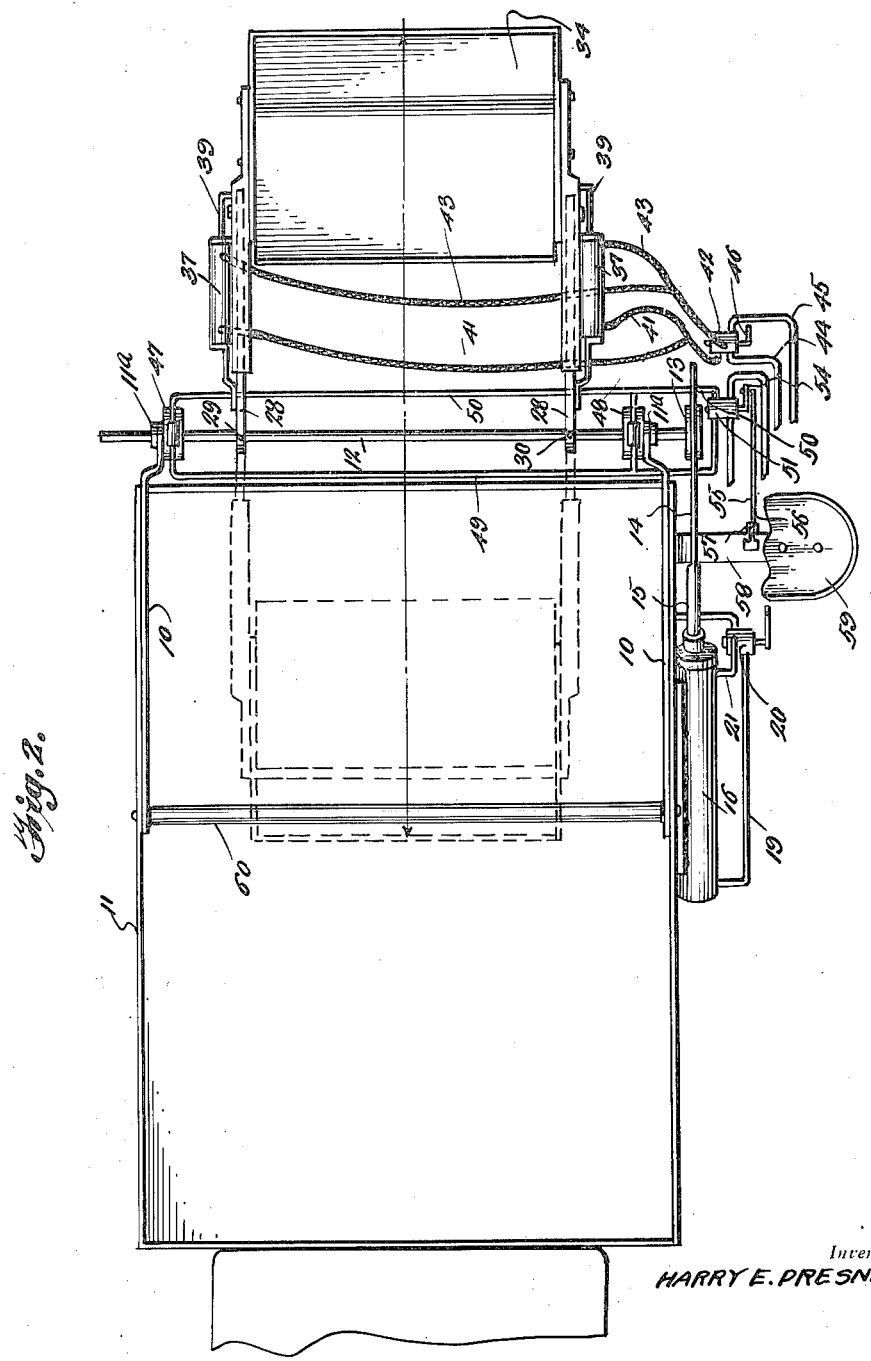

Sept. 6, 1949.　　　　H. E. PRESNELL　　　　2,480,959
CARGO LOADER FOR VEHICLES
Filed July 3, 1947　　　　　　　　　　　3 Sheets-Sheet 3
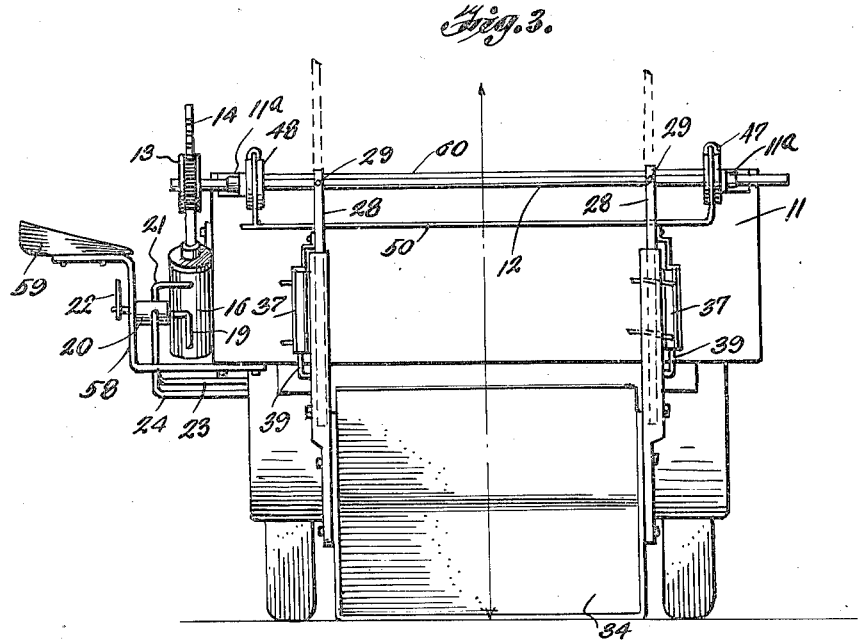
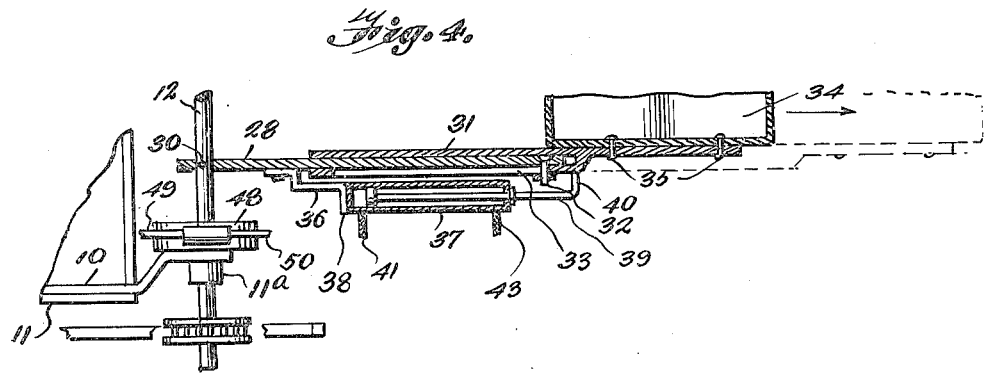
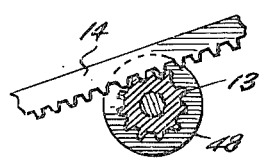
Inventor
HARRY E. PRESNELL
By Randolph & Beavers
Attorneys Patented Sept. 6, 1949

2,480,959

UNITED STATES PATENT OFFICE 2,480,959

CARGO LOADER FOR VEHICLES

Harry E. Presnell, Mesa, Ariz.

Application July 3, 1947, Serial No. 758,879

1 Claim. (Cl. 214—78)

The present invention relates to cargo loaders and it consists in the combinations, constructions and arrangements of parts herein described and claimed.

It is an object of the present invention to provide a cargo loader for trucks and the like which is simple in operation, economical in its construction and which may be readily and easily attached to a truck or the like.

Another object of the invention is to provide a scoop having simple means for raising and lowering the same.

A further object of the invention is the provision of a loading apparatus capable of attachment to small trucks and operable by means of power derived from the power plants of such trucks.

Another object of the invention is the provision of novel hydraulic means for the raising and lowering of a scoop.

Another object of the invention is the provision of novel hydraulic means for moving the scoop with relation to the supporting arms therefor.

Other and further objects of the invention will become apparent from a reading of the following specification taken in conjunction with the drawings, in which:

Figure 2 is a plan view thereof,

Figure 3 is a rear elevational view of the apparatus shown in Figures 1 and 2, and Figures 4 and 5 are fragmentary sectional views disclosing certain details of the invention.

Figure 1:
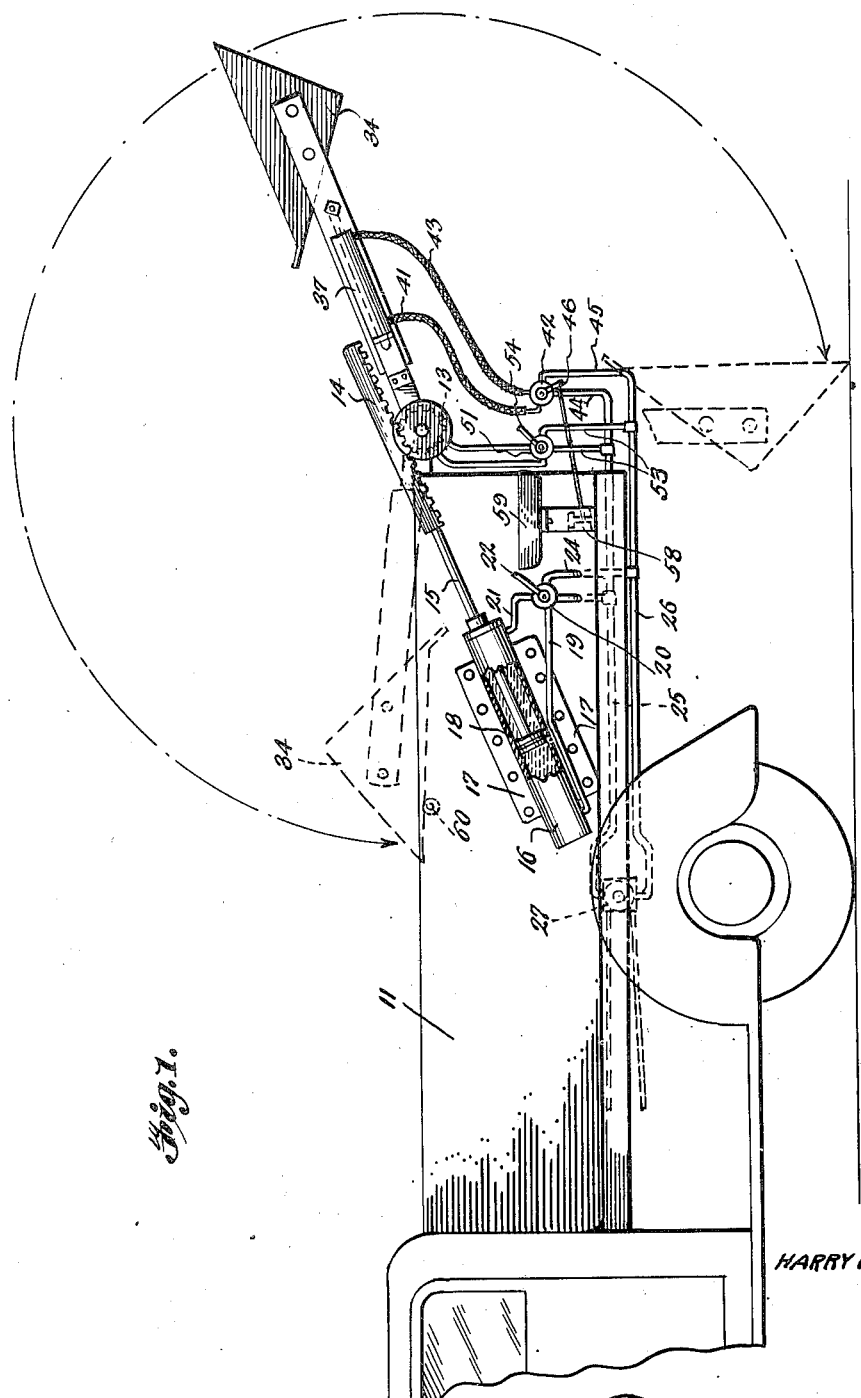
Figure 1 is a side elevational view of an embodiment of the invention.

Generally, there is provided an apparatus for attachment to trucks which is particularly useful with respect to the smaller trucks in present use but which may be used with equal adaptability with trucks of any size. The apparatus is adapted to be mounted at the rear of the truck body and consists principally of a scoop mounted upon a pair of arms which are, in turn, affixed to a transversely extending shaft which is adapted to be revolved by means of a rack forming a part of a hydraulic ram which is motivated by means of a hydraulic unit mounted upon the side of the truck. Provision is also made for a hydraulic unit to be mounted upon each of the arms whereby the scoop may be moved along the horizontal axis of arms by hydraulic means at the will of the operator. The latter feature is important in that when a scoop is filled under ordinary circumstances a great deal of power is wasted in releasing the scoop and its contained load from the material being worked upon due to suction and other factors. By providing means for moving the scoop directly upwardly from the material being acted upon when the scoop has been filled, power and time is accordingly conserved.

Referring now more particularly to the drawings, there is shown therein an apparatus comprising a pair of rearwardly extending brackets 10 adapted to be attached to the upper rear of a truck body 11. The rearward ends of the brackets 10 terminate in journals 11a in which is revolubly mounted a transversely extending shaft 12 having a gear 13 mounted at one end thereof. Enmeshed with the gear 13 is a rack 14 affixed to the shaft 15 of a hydraulic ram 16 which is affixed to the side of the truck body 11 by means of bolted flanges 17 and which is provided with the conventional piston 18. A pipe 19 interconnects the lower end of the ram 16 with a raising and lowering valve 20 and a pipe 21 interconnects the upper end of the ram 16 with the valve 20. An operating handle 22 is provided for the valve 20.

Pipes 23 and 24 interconnect pipe lines 25 and 26, respectively, extending from a hydraulic power unit 27 operated by the engine (not shown) of the truck. A pair of arms 28 is affixed to the shaft 12, as indicated at 29 and 30 and each has slidably engaged thereon a scoop support 31 each provided with a slot 33 in which an outwardly extending bolt 32 carried by the arm 28 is adapted to ride. A scoop 34 is carried between the supports 31 by means of bolts 35. To each of the arms 28 is affixed an outwardly extending bracket 36 to which a cylinder 37 of a hydraulic ram is attached. A piston 38 is provided in each of the cylinders 37 and each of the pistons is provided with a rod 39, the outer end of which is attached to the support 31, as indicated at 40.

A flexible pipe 41 interconnects the inner end of the cylinder 37 with a scoop extension valve 42 and a flexible pipe connection 43 interconnects the outer end of the cylinder 37 with the valve 42. The valve 42 is connected by means of pipes 44 and 45 with the pipes 25 and 26, respectively, and an operating handle 46 is provided for the valve 42. A pair of brakes 47 and 48 of the hydraulic type is mounted around the shaft 12 and is adapted to be operated by means of hydraulic fluid supplied by pipes 49 and 50 from a brake valve 51 having pipe connections 52 and 53 with the pipes 25 and 26, respectively.

The valve 51 is provided with an operating lever 54 connected by a link 55 to a foot lever 56 pivotally mounted, as indicated at 57 to a seat support 58 having an operator's seat 59 at its outer end. A transversely extending bar 60 is affixed to the upper sides of the truck body.

In operation, it will be seen that when it is desired to load material into the truck body 11, the operator may move his truck to a point adjacent the material to be loaded and that thereafter he will take his position upon the seat 59. By manipulating the valve 20 he will cause the rack 14 to move by means of the ram 16 and thereby cause the scoop 34 to rotate downwardly to a digging position, as is clearly shown in Figure 1. Thereafter, he may adjust the height of the scoop 34 with respect to the ground by means of the valve 42 operating through the cylinders 37 and supports 31. But again operating the valve 20, the scoop may be moved sufficiently to fill the same whereupon the valve 42 may be again operated to lift the valve vertically away from the material being operated upon. By manipulating the valve again the scoop may be rotated upwardly and inwardly of the truck to the dotted line position shown in Figure 1 whereupon it will come into contact with the bar 60 and the material contained in the scoop will be transferred to the truck body 11. By operating the valve 51 the brakes 47 and 48 may be applied thus allowing the operator to lower the load with safety through the use of the foot pedal 56. It will be seen that the operating handles for the valves 20 and 42 may be at all times in the hands of the operator and that the operator's foot may be at all times upon the lever 56 so that he may have full and complete control of the apparatus at all times.

While but one form of the invention has been shown and described herein, it will be readily apparent to those skilled in the art that many minor modifications may be made without departing from the spirit of the invention or the scope of the appended claim.

What is claimed is:

A unitary apparatus of the character described adapted to be attached to a truck and comprising a frame, a transversely extending shaft revolubly mounted in the frame, a pair of arms affixed to the shaft, means for revolving the shaft, a scoop carried by the lower ends of the arms and hydraulically operated means for moving the scoop longitudinally of said arms, said means for moving the scoop longitudinally of said arms comprising a pair of supports for the scoop slidably mounted upon the arms, a hydraulic ram interconnecting the arms and the supports, a source of power for the rams and a valve for controlling the rams and said means for revolving the shaft comprising a hydraulic ram affixed to the truck, a rack movable by the ram, a gear carried by the shaft and enmeshed with the rack, a source of hydraulic power for the ram and a control valve for the ram.

HARRY E. PRESNELL.

REFERENCES CITED

The following references are of record in the file of this patent:

UNITED STATES PATENTS

| Number | Name | Date |
| --- | --- | --- |
| 1,285,058 | Dages et al. | Nov. 19, 1918 |
| 1,381,585 | Nelson | June 14, 1921 |
| 2,170,932 | Venema | Aug. 29, 1939 |
| 2,200,447 | Flynn et al. | May 14, 1940 |
| 2,296,085 | Boldt | Sept. 15, 1942 |
| 2,321,630 | Shippee | June 15, 1943 |